United States Patent [19]

Waterman et al.

[11] Patent Number: 5,370,175
[45] Date of Patent: Dec. 6, 1994

[54] MEANS FOR SEALING OUTLET OF CONDENSING HEAT EXCHANGER

[76] Inventors: Timothy J. Waterman, 14472 Saddleback Dr., Carmel, Ind. 46032; Michael J. Larsen, 393 W. Broadway, Danville, Ind. 46122; Scott A. Beck, 10845 Bellefontaine, Indianapolis, Ind. 46280

[21] Appl. No.: 107,284

[22] Filed: Aug. 16, 1993

[51] Int. Cl.⁵ ............................................. F28F 9/16
[52] U.S. Cl. .................................... 165/79; 165/139; 165/173; 285/331; 285/915
[58] Field of Search ................. 165/79, 139, 173, 178, 165/921; 285/331, 915; 126/99 R, 116 R

[56] References Cited

U.S. PATENT DOCUMENTS

| | | | |
|---|---|---|---|
| 332,754 | 12/1885 | Scott | 285/331 |
| 362,938 | 5/1889 | Cogswell | 165/139 |
| 2,165,920 | 7/1939 | Burnip . | |
| 2,987,329 | 6/1961 | Barton | 285/382 X |
| 3,913,955 | 10/1975 | Teja . | |
| 4,056,273 | 11/1977 | Cassel . | |
| 4,256,333 | 3/1981 | Jones | 285/915 X |
| 4,516,630 | 5/1985 | Yamaguchi | 165/139 X |

FOREIGN PATENT DOCUMENTS 2180634 4/1987 United Kingdom ............... 165/173

Primary Examiner—Stephen M. Hepperle

[57] ABSTRACT

A multi-cell secondary heat exchanger for use in a high efficiency, multi-poised furnace wherein each cell has outwardly extended exit or entrance bells that are received in grooves formed in adjacent cell panels. The grooves surround exit or entrance ports and are filled with a sealing material that provides a fluid tight seal between the cell panel and the bell.

12 Claims, 3 Drawing Sheets

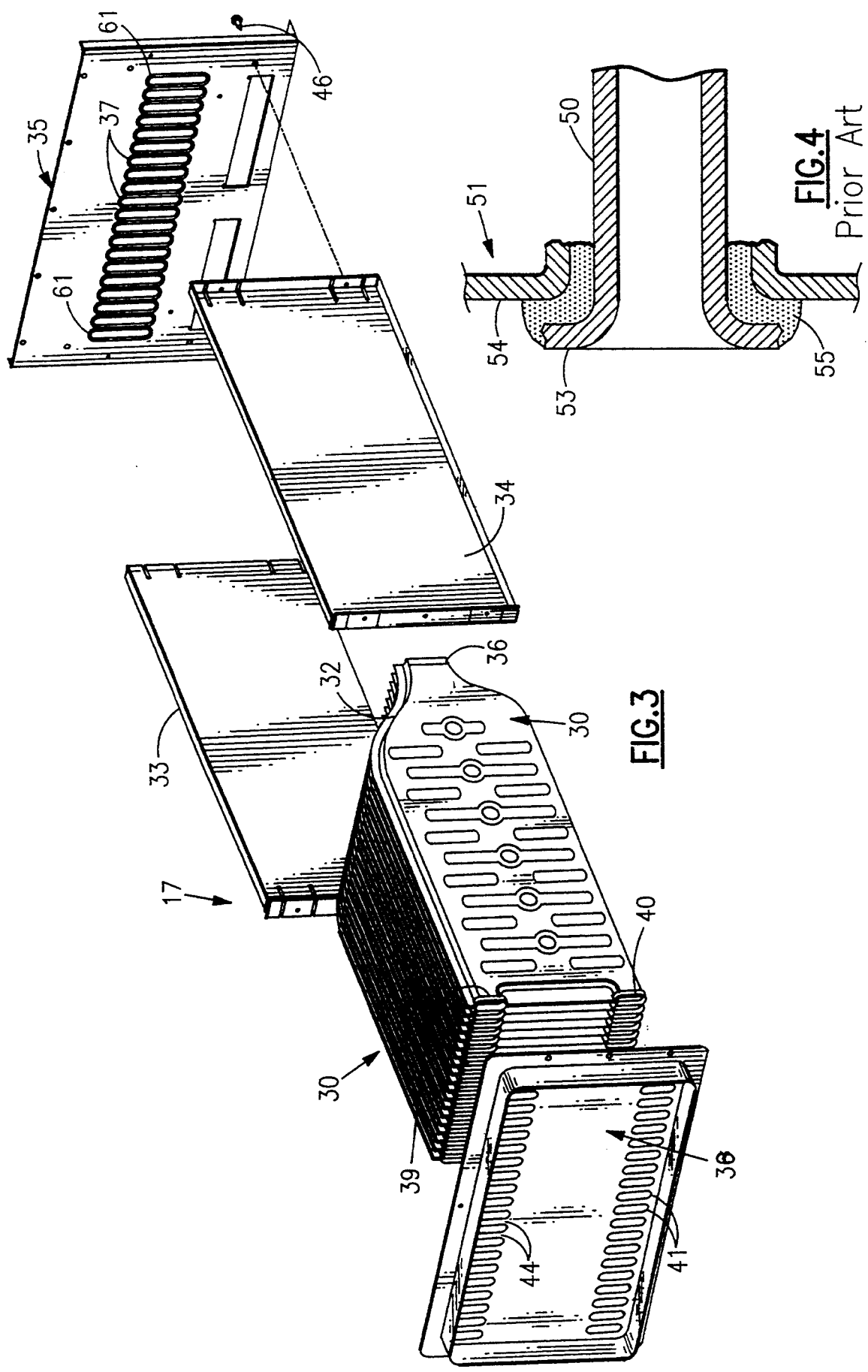

MEANS FOR SEALING OUTLET OF CONDENSING HEAT EXCHANGER

BACKGROUND OF THE INVENTION

This invention relates to a high efficiency furnace containing a secondary condensing heat exchanger and, in particular, to an improved secondary heat exchanger construction.

Many condensing furnaces containing secondary heat exchangers utilize flared entrance and exit ports for connecting each of the heat exchanger cells to opposed cell panels. The entrance and exit ports are typically round or oval cylinders that extend outwardly from the end walls of the cell housing. The cylinders are passed through openings formed in the cell panels and the ends of the cylinders are expanded or coined radially adjacent to the front face of the panel. To close the joint between the end of the cylinder and the panel, the joint region is filled with RTV. Typically, an excess of RTV is employed in an effort to fully close the joint. This procedure is wasteful and too much RTV can overfill the joint and create performance problems. By the same token, under filling of the joint can create leaks in the joint region, again leading to poor furnace performance.

SUMMARY OF THE INVENTION

It is therefore an object of the present invention to improve high efficiency furnaces equipped with secondary condensing heat exchangers.

It is a further object of the present invention to more effectively secure the heat exchanger cells of a secondary heat exchanger to opposing cell panels.

A still further object of the present invention is to prevent leakage in the entrance and exit joint regions of a secondary condensing heat exchanger.

Another object of the present invention is to simplify the procedures for assembling a secondary heat exchanger used in a high efficiency furnace.

Yet another object of the present invention is to provide a controlled procedure for joining and sealing a heat exchanger cell to opposing heat exchanger panels.

BRIEF DESCRIPTION OF THE DRAWINGS

For a better understanding of these and other objects of the present invention, reference will be made to the following detailed description of the invention which is to be read in association with the accompanying drawings, wherein:

FIG. 3 is an enlarged exploded view illustrating the secondary heat exchanger of the present invention;

FIG. 4 is an enlarged partial side elevation in section illustrating a sealed joint used in the prior art to join a heat exchanger cell to a cell panel.

DESCRIPTION OF THE INVENTION

Figure 1:
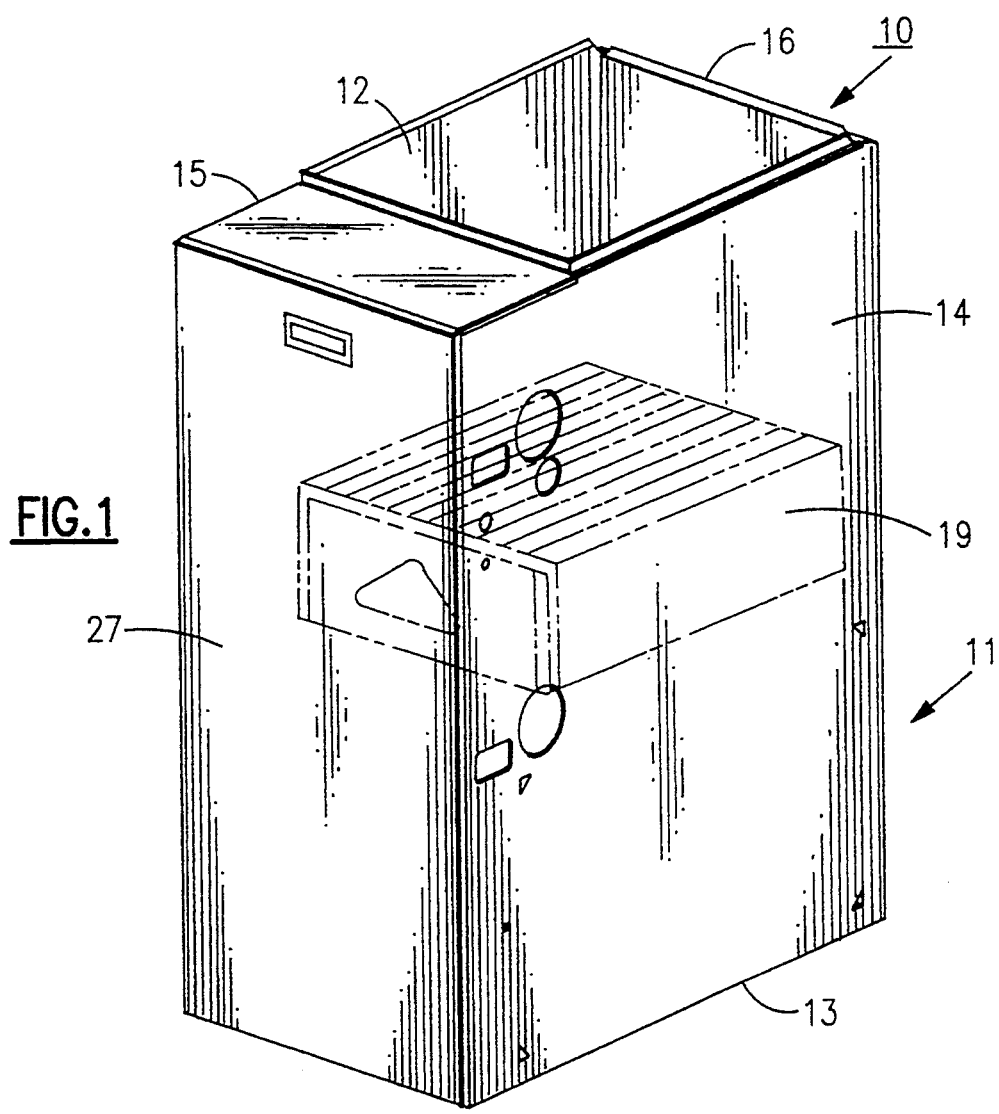
FIG. 1 is a perspective view showing a multipoised furnace containing a secondary condensing heat exchanger embodying the teachings of the present invention.
Figure 2:
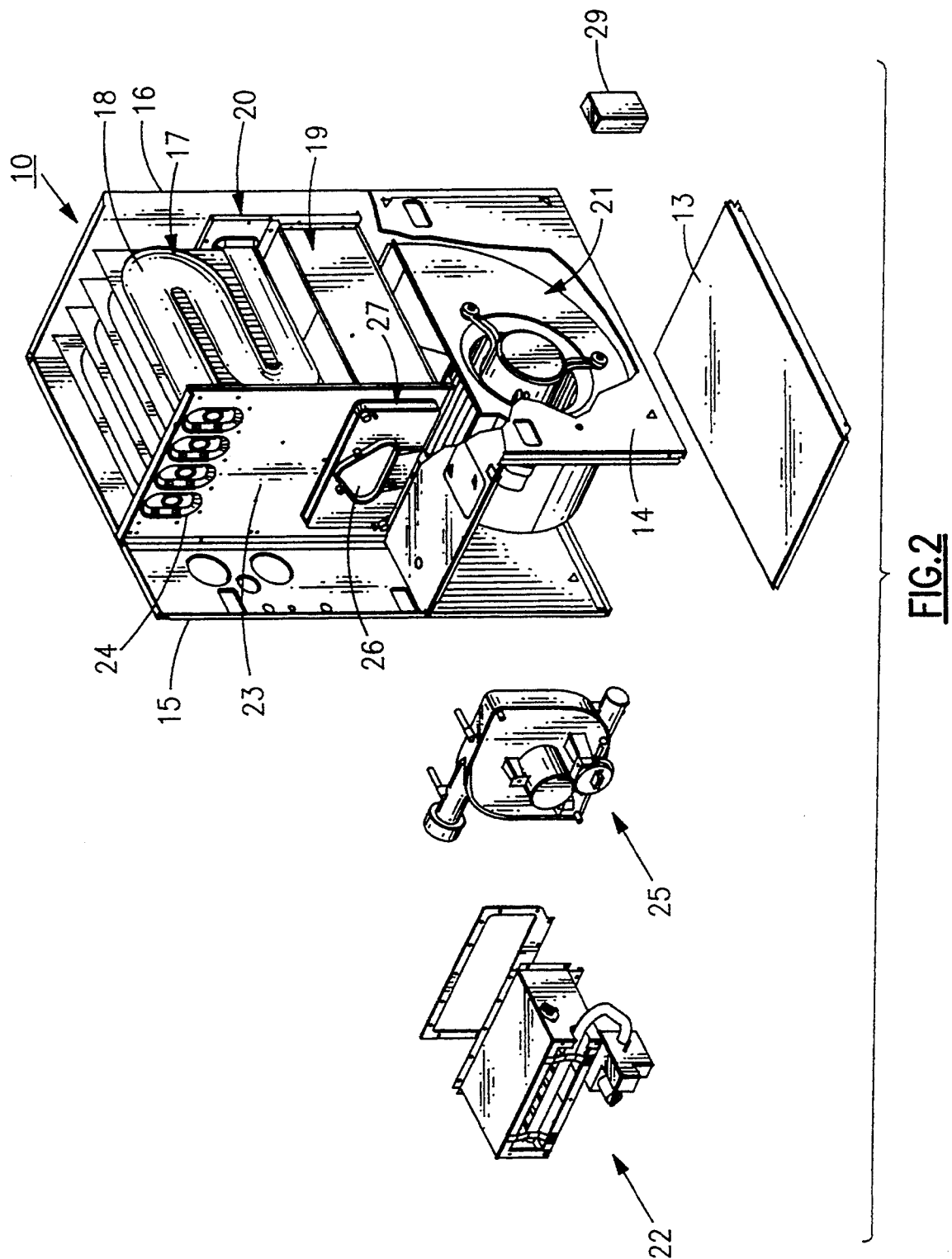
FIG. 2 is an exploded perspective view of the multi-poised furnace shown in FIG. 1 further illustrating the component parts thereof.

Referring initially to FIGS. 1 and 2, there is illustrated a, high efficiency, multi-poised furnace unit generally referenced 10, that is housed within a compact enclosure 11. Although the furnace may be installed in a number of different orientations, it is shown in FIGS. 1 and 2 in an upflow orientation wherein air is returned from a comfort zone through the bottom part of the unit and passed upwardly through the unit through a supply air duct 12 that opens through the top wall of the unit. The working parts of the furnace are enclosed by a pair of side panels 14 and 15, a back panel 16, a removable front panel 27 and a floor panel 13. Although not shown, the furnace may be selectively configured so that return air may enter the bottom section of the unit through either one of the side walls. A secondary condensing heat exchanger 19 is mounted within the unit inside the supply air duct.

The major components of the furnace are illustrated in FIG. 2. These include, in addition to the secondary heat exchanger 19, a primary heat exchanger 17 that is also mounted in the supply air duct immediately above the secondary heat exchanger. The outlet side of the primary heat exchanger is operatively connected in fluid flow communication with the inlet side of the secondary heat exchanger by means of a flue gas manifold 20. A return air fan 21 is mounted in the lower section of the unit and is arranged to force air from a comfort region upwardly through the supply air duct.

A burner assembly 22 is affixed to an interior vertical support panel 23 in front of the entry ports 24 to each of the primary heat exchanger cells 18. The burner assembly contains a separate burner for each heat exchanger cell and is adapted to inject high temperature flue gas directly into the adjacent cells.

An inducer 25 is also affixed to the vertical support panel 23 and is connected in assembly to the exit 26 of collector box 27 located on the discharge side of the secondary heat exchanger. The inducer is arranged to draw flue gas products through the two heat exchangers and discharges the spent products into a venting system (not shown) from which it is discharged to ambient. The inducer can be arranged to vent to either side of the furnace depending upon its orientation. The secondary heat exchanger is designed to conduct any condensate that is generated in this region into the collector box 27 from where it is conducted to an appropriate condensate trap 29 for ultimate disposal.

FIG. 3 is an exploded view of the secondary heat exchanger employed in the present furnace. The secondary heat exchanger includes a series of parallel heat exchanger cells 30-30 which are vertically disposed in the supply air duct so that supply air is drawn over the outer surfaces of each cell. The cells may be separated by flat fin plates 32 that help distribute air over the cells. As will be explained below, the cells are suspended between opposed cell panels 35 and 36. The rear cell panel 35 forms the front wall of the flue gas manifold 20 and contains a series of inlet ports 37—37 that are coupled in assembly to the inlet bells 31 of the secondary heat exchanger cells. The front cell panel 36, which is contained within the collector box 27, contains two parallel rows of exit ports 44 and 41 that are coupled in assembly with the upper exit bells 39 and lower exit bells 40, respectively, of each secondary heat exchanger cell. The two cell panels are connected together in assembly by means of a pair of support panels 33 and 34 that are attached to the end panels by suitable fastener means such as screws 46.

FIG. 4 illustrates a typical bell connection utilized in the prior art to provide a fluid tight seal between the heat exchanger entrance and exit bells and the cell panels. In this prior art arrangement, the extended bell section 50 is passed through a suitable opening formed in the adjacent cell panel 51 and the distal end of the bell is mechanically turned outwardly and back to form a flange 53 adjacent to the outer face 54 of the cell panel. The joint region between the bell flange and the cell panel is closed and sealed using an RTV material 55. This type of connection requires a good deal of time and effort to complete. In addition, sealing of the joint region has also proven to be difficult because it is difficult to gauge if too much or too little RTV material is being applied to the joint region. In the event too little material is used, the joint will leak. On the other hand, use of too much material results in the wasting of material and in certain cases can adversely affect performance.

Figure 5:
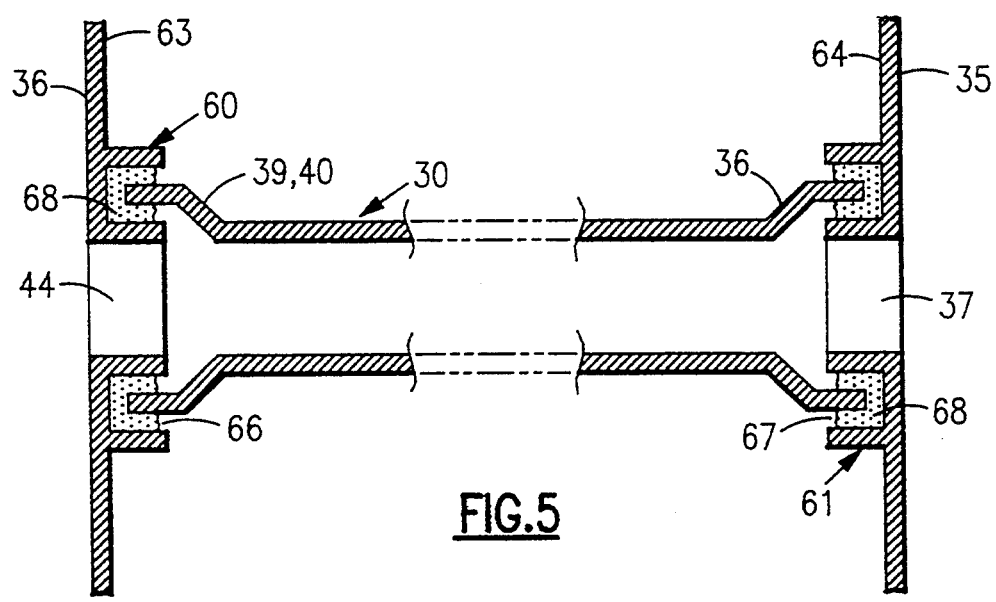
FIG. 5 is an enlarged partial top view in section showing a heat exchanger cell of the present invention joined to a pair of opposed cell panels.

FIG. 5 is a cross-section taken through one of the secondary heat exchanger cells 30 used in the present furnace. As explained above, each cell contains an entrance bell 31 located at one end of the cell and a pair of exit bells 39 and 40 located at the other end of the cell. The cell housing converges from the entrance bell toward the exit bells so that condensate collected in the housing will drain out of the housing through one or both of the exit bells depending upon the furnace's orientation.

The bell sections of the cell 30 are shown slightly exaggerated in FIG. 5 for the sake of clarity. It should be evident, however, that the bells can take almost any suitable configuration provided they exit outwardly from the end walls of the cell housing some distance. In this embodiment of the invention, the bells are oval in form and are arranged in assembly to align with the entrance port 37 and exit ports 44 provided in the cell panels 35 and 36, respectively. Raised flanges are mounted upon the inside walls 63 and 64 of the opposed cell panels. The flanges 60 and 61 loosely surround each of the exit and entrance ports 44 and 37, respectively, contained in the cell panels. complements the shape of an adjacent bell. In assembly, the bells are passed into the grooves as illustrated and the groove region is filled with a sealing material 68 to provide a leak tight joint between the bell and the cell panel. Preferably an RTV silicone material is used to close and seal the joint region.

As can be seen, the present joint utilizes a compression type seal design that prevents the sealing material from entering the panel cell entry and exit ports. In addition, the amount of sealing material placed in each joint region can be closely controlled thereby insuring that the joint is properly sealed without the use of excessive material. It should also be evident that the amount of time required to assemble the secondary heat exchanger described herein is considerably shortened in that no mechanical working of the bell is required to complete the connection.

While this invention has been explained with reference to the structure disclosed herein, it is not confined to the details set forth and this invention is intended to cover any modifications and changes as may come within the scope of the following claims:

What is claimed is

1. In a high efficiency furnace containing a multi-cell secondary condensing heat exchanger, said furnace including a supply air duct and a pair of opposed cell panels mounted in said duct, each cell panel having ports formed therein, a plurality of parallel aligned heat exchanger cells mounted between said cell panels, each cell including an elongated housing having a front wall and a back wall, a hollow outwardly extended entrance bell mounted in the front wall and at least one hollow outwardly extended exit bell mounted in the back wall for permitting fluid to enter and leave the cell, raised flange means located on opposing cell panel walls that surround each of the openings formed in said panels, each flange means having a groove for receiving, in a loose fit relationship, the distal end of a bell therein, and sealing means in each groove to provide a flexible fluid tight joint between the bell and the flange.

2. The furnace of claim 1 wherein each cell contains first and second exit bells.

3. The furnace of claim 2 wherein each cell contains a single entrance bell centered along the central axis of the bell housing.

4. The furnace of claim 1 wherein each cell is oval shaped.

5. The furnace of claim 1 wherein said sealing means is an RTV silicone.

6. In a multi-poised furnace having a secondary condensing heat exchanger that includes a pair of opposed cell panels, a plurality of secondary condensing heat exchanger cells supported between said cell panels, each heat exchanger cell including an elongated housing having opposed side walls and opposed end walls, said side walls converging from a first end wall toward a second end wall, each cell further including first and second exit belle extending outwardly from said second end wall, a plurality of raised flanges mounted on one of the cell panel walls adjacent said first and second exit bells, each flange surrounding an exit port formed in said adjacent panel, each flange means having a groove formed therein for receiving, in a loose fit relationship, the distal end of an exit bell, and sealing means in each of said grooves to provide a flexible fluid tight joint between the exit bells and the flanges.

7. The furnace of claim 5 wherein each exit bell is oval shaped.

8. The furnace of claim 6 wherein the sealing means is an RTV silicone.

9. In a secondary heat exchanger having a plurality of heat exchanger cells supported between cell panels, said cells having exit and entrance bells that are placed in alignment with exit and entrance ports formed in the cell panels, the improvement comprising one of said end panels containing exit ports and further including exit bell receiving grooves surrounding each of said exit ports, each heat exchanger cell having at least one outwardly extended exit bell that is loosely positioned inside one of said exit bell receiving grooves, and a sealing means contained in each cell panel groove for forming a flexible fluid tight seal between the one cell panel and the exit bells.

10. The secondary heat exchanger of claim 9 wherein each heat exchanger cell contains a plurality of exit bells.

11. The secondary heat exchanger of claim 9 wherein the sealing means is RTV silicone.

12. The secondary heat exchanger of claim 9 that further includes a second end panel containing entrance ports and further including entrance bell receiving grooves surrounding each of the entrance ports, each heat exchanger cell having an outwardly extended entrance bell that is loosely positioned with one of the entrance bell receiving grooves, and sealing means contained in each entrance bell receiving groove for forming a flexible fluid tight seal between the second end panel and the entrance bells.

* * * * *